United States Patent [19]

Oliver

[11] Patent Number: 4,533,172
[45] Date of Patent: Aug. 6, 1985

[54] DISCONNECTABLE AUTOMOTIVE VEHICLE FRAME

[76] Inventor: Gary R. Oliver, c/o Tri-City Buggy, 2135 - 11th St., Rock Island, Ill. 61201

[21] Appl. No.: 577,172
[22] Filed: Feb. 6, 1984
[51] Int. Cl.³ .............................................. B62D 31/00
[52] U.S. Cl. ................................... 296/185; 296/189; 296/196; 296/205
[58] Field of Search ........................ 296/185, 187–189, 296/193–197, 203–205

[56] References Cited

U.S. PATENT DOCUMENTS

| 4,205,872 | 6/1980 | Bollinger | 296/205 |
| 4,260,280 | 4/1981 | Hirn et al. | 296/196 |
| 4,355,844 | 10/1982 | Fantini | 296/205 |

FOREIGN PATENT DOCUMENTS

| 411691 | 5/1945 | Italy | 296/205 |

Primary Examiner—Robert R. Song
Attorney, Agent, or Firm—Henderson & Sturm

[57] ABSTRACT

The disclosure is of a three-piece, skeletal framework for an automotive vehicle, especially of the racing type, made up of front-end, intermediate and rear-end units disposed in fore-and-aft, end-to-end relationship and rigidly but readily disconnectably united so as to enable quick and inexpensive replacement of the front and rear units, each of which end units is constructed if lightweight, low-cost materials as compared to the heavier and stronger structure of the intermediate unit, which serves as a protective cage for a driver while the front and rear units can yield to collision impacts and thus serve to cushion the intermediate unit. The welding incompatibility of the structural members as among the front and rear and intermediate units lends itself to separable connections rather than welding and thus adds to the economy and structural integrity of the frame as a whole.

1 Claim, 3 Drawing Figures

DISCONNECTABLE AUTOMOTIVE VEHICLE FRAME

BACKGROUND OF THE INVENTION

1. Field of the Invention

This invention relates generally to an automotive vehicle frame comprised of two or three disconnectable subunits and, more particularly, pertains to such automotive vehicle frames utilized in automobile racing.

2. Description of the Prior Art

Current practice among constructors of frames to be utilized in racing automobiles is to fabricate a weldment from steel tubing and channel wherein said weldment comprises a singular one-piece unit.

When the vehicle becomes involved in a crash, repair of such a frame is often difficult or impossible due to its one-piece nature. When repair is possible, it is accomplished by cutting and rewelding that portion of the frame that has been damaged. This method is costly and time consuming and can produce unsatisfactory results. Furthermore, crash damage to the frame is often irreparable thus necessitating the replacement of the entire frame.

Because the central portion of such a one-piece frame is designed to protect the driver, it is necessarily constructed from steel or steel alloy tubing. As current practice dictates that the entire frame is welded from individual components, it is technically difficult or impossible for the constructor to weld lightweight aluminum parts onto the steel central protective portion of the frame. Therefore, the entire one-piece frame must be constructed from steel or steel alloys which are heavier than aluminum and such frames cannot comprise a hybrid of steel and aluminum. Thus, certain weight disadvantages are attendant to the current practice among constructors of one-piece racing automotive frames.

Therefore, it is desirable to provide an automotive vehicles frame which permits the easy replacement of the vehicle front and rear portions of the frame with respect to the central driver cage.

Additionally, it is desirable to provide an automotive vehicle frame which permits steel cage construction to protect the driver while allowing utilization of aluminum and other lightweight alloys in the front and rear portion of said frame in order to save weight.

SUMMARY OF THE INVENTION

Therefore, it is provided in the practice of this invention according to a presently preferred embodiment an automotive vehicle frame comprising front, intermediate and rear skeletal units disposed fore and aft in an end-to-end alignment to establish an elongated rigid framework. The intermediate unit is constructed of a plurality of vertically an horizontally disposed top, bottom and side rib elements rigidly united to provide a cage-like structure for housing a driver. Said intermediate unit further comprises a plurality of laterally and vertically spaced apart front and rear connection portions while the front and rear units, respectively, have front and rear connection portions respectively mating with the front and rear connection portions of the intermediate unit. Additionally provided are the front and rear disconnectable securing means for rigidly securing the three units together via said connection portions.

BRIEF DESCRIPTION OF THE DRAWINGS

These and other features and advantages of the present invention will be better understood by reference to the following detailed description when considered in connection with the following drawings wherein.

DESCRIPTION OF THE PREFERRED EMBODIMENT

Figure 1:
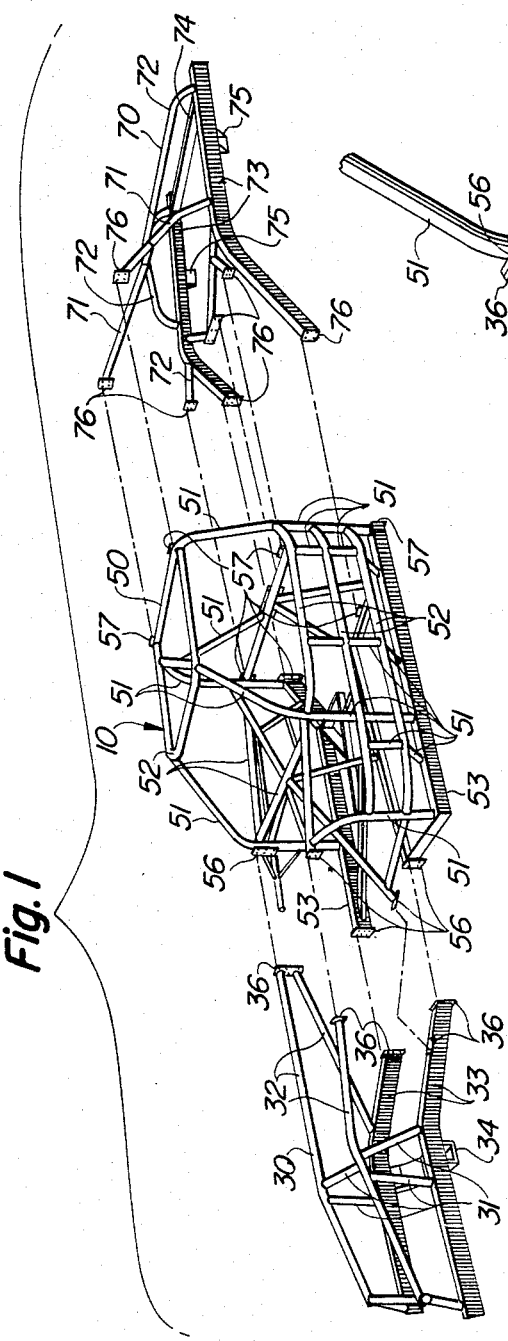
FIG. 1 is a perspective view illustrating the automobile vehicle frame constructed according to the principles of this invention.
Figure 2:
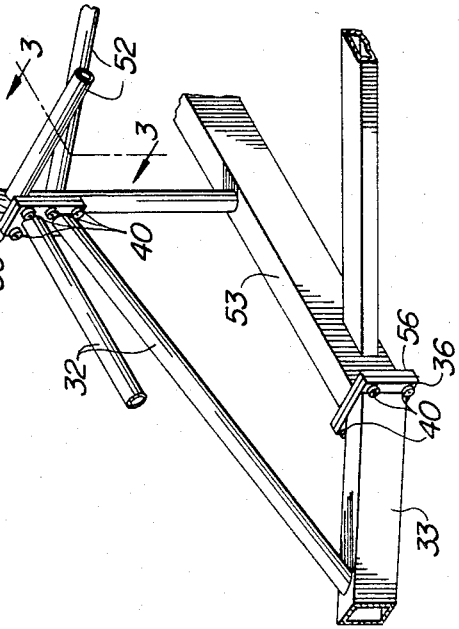
FIG. 2 is a detailed view illustrating a portion of the front and intermediate units of the automotive vehicle frame and several of their associated flanges for connecting same.
Figure 3:
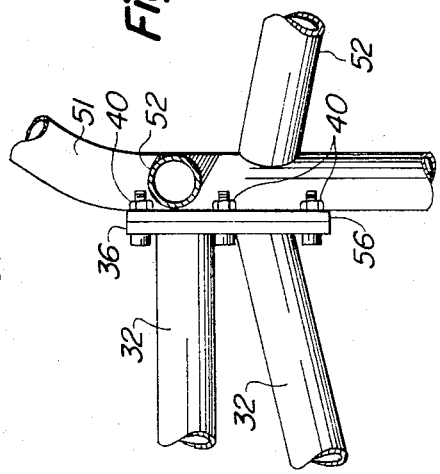
FIG. 3 is a cross-section on line 3—3 of FIG. 2.

FIGS. 1, 2 and 3 show a preferred embodiment of the automotive vehicle frame 10 constructed according to the principles of this invention. The frame is comprised of a front section 30 and intermediate section 50 and a rear section 70.

The intermediate unit 50 is comprised of a plurality of generally vertical tubular elements 51 welded at their ends to a plurality of horizontal elements 52. The combination of horizontal 52 and vertical 51 rib-like elements, being rigidly united by welding, provide a cage-like structure for housing a driver and protecting him by minimizing injury due to sidewardly directed impact. The cage-like structure so fabricated is rigidly attached to a pair of generally parallelly disposed side channels 53 by welding the ends of the generally vertical rib-like elements 51 to said channels 53.

The front unit 30 is comprised of a plurality of generally vertical rib-like elements 31 which are rigidly attached by welding at their ends to generally horizontal rib-like elements 32. A pair of generally parallel channels 33 are rigidly attached to the ends of the vertical rib-like elements 31 by welding. A transverse member 34 is welded at each end to one of the side channels 33. Said transverse channel 34 provides a means for attachment of a vehicle power plant (not shown).

The rear unit 70 is comprised of a plurality of generally vertically disposed tubular rib-like elements 71 which are welded at their ends to generally horizontal rib-like elements 72. A pair of generally parallelly disposed channels 73 are separated at their distal end by a transverse channel element 74. A pair of hangers 75 are welded to the channel 74 and provide attachment points for the vehicle's rear suspension (not shown).

In a preferred embodiment, the front 30, intermediate 50 and rear 70 skeletal units are disposed fore and aft in an end-to-end arrangement to establish an elongated rigid framework. The front unit 30 is removably attachable to the intermediate unit 50 by means of a plurality of flanges 36 attached to the ends of the horizontal tubular elements 32 and to the ends of the channels 33. The flanges 36 of the front unit 30 cooperatively engage with a plurality of flanges 56 attached by welding to the front of the intermediate unit 50 at the ends of the horizontal elements 52.

A plurality of threaded fasteners 40 are utilized to rigidly secure the front 30 and intermediate unit 50 through holes (not shown) provided in their respective flanges 36 and 56.

The rear unit 70 and the intermediate unit 50 are removably attachable by means of flanges 57 welded to various locations on the rib-like elements 51 and 52 and on the rearward ends of the parallel channels 53 of the intermediate unit 50. These flanges 57 cooperatively engage corresponding flanges 76 welded to the ends of the rib-like elements 71 and 72 and the ends of the parallel channels 73 of the rear unit 70. Threaded fasteners 40 are utilized to rigidly secure said intermediate unit 50 and rear unit 70 through their respective flanges 57 and 76.

In the preferred embodiment, the vertical 51 and horizontal 52 rib-like elements are constructed from steel and steel alloy tube which are appropriately welded at the ends and at the intermediate positions thereof. Additionally, the channels 53 of the intermediate unit 50 are also constructed of steel to provide additional rigidity, strength and protection for the driver of the vehicle.

Moreover, in the practice of the preferred embodiment, the front unit 30 and the rear unit 70 may be constructed from aluminum and other lightweight metallic alloys as there is no problem of welding dissimilar metals. The utilization of lightweight metals in the front 30 and rear 70 units reduces the weight of the vehicle where the additional strength is not necessitated.

In a typical situation, a racing vehicle is constructed by first assembling the front 30, intermediate 50 and rear 70 frame subunits. The power train is then installed as well as the front and rear suspensions. Finally, the body and interior components are added to complete the vehicle. If the vehicle is involved in a crash, it generally results in damage to front or rear of the car. This type of damage usually involves only the front unit 30 or the rear unit 70. Thus, the invention provides a convenient means for quickly and easily replacing said units without replacement or repair of the intermediate unit.

The described embodiments of the invention are only considered to be preferred and illustrative of the inventive concept. The scope of the invention is not restricted to such embodiments. Various and numerous other arrangements may be devised by one skilled in the art without departing from the spirit or the scope of this invention. For example, the automotive vehicle frame may be comprised two units, namely, a front unit and rear unit wherein the intermediate unit and rear unit are combined as one, single unit. Additionally, the arrangement of the vertical and horizontal rib-like elements can be varied to accommodate differing drive trains, suspension arrangements and body types without departing from the spirit and the scope of this invention.

I claim:

1. An automotive vehicle frame comprising front, intermediate and rear units disposed in end-to-end alignment to establish a fore-and-aft elongated rigid framework, each unit being of skeletal construction made up of horizontal and vertical rib elements rigidly united by welding to provide a unitized cage-like structure, basically independent of the other units, the elements of the intermediate unit being of relatively strong, stiff material affording substantial protection for a driver in crash conditions, and the members of each of the front and rear units being of relatively lighter material deformable under crash conditions and thus effective to cushion the intermediate unit against crash forces, the members of the intermediate unit being further weldable as among themselves, the material of the members of each of the front and rear units being such that the members of each front and rear unit are weldable as among themselves but non-weldable to the intermediate unit members, and first and second sets of disconnectable means rigidly securing the front and rear units respectively to the intermediate unit, each set including rigid cooperative elements rigidly attached respectively to the units and separable rigid fasteners rigidly interconnecting the respective elements.

* * * * *